Feb. 13, 1940.　　D. G. HAWTHORN ET AL　　2,189,900
DRILL STEM CIRCUIT TESTER
Filed June 18, 1938　　2 Sheets-Sheet 1
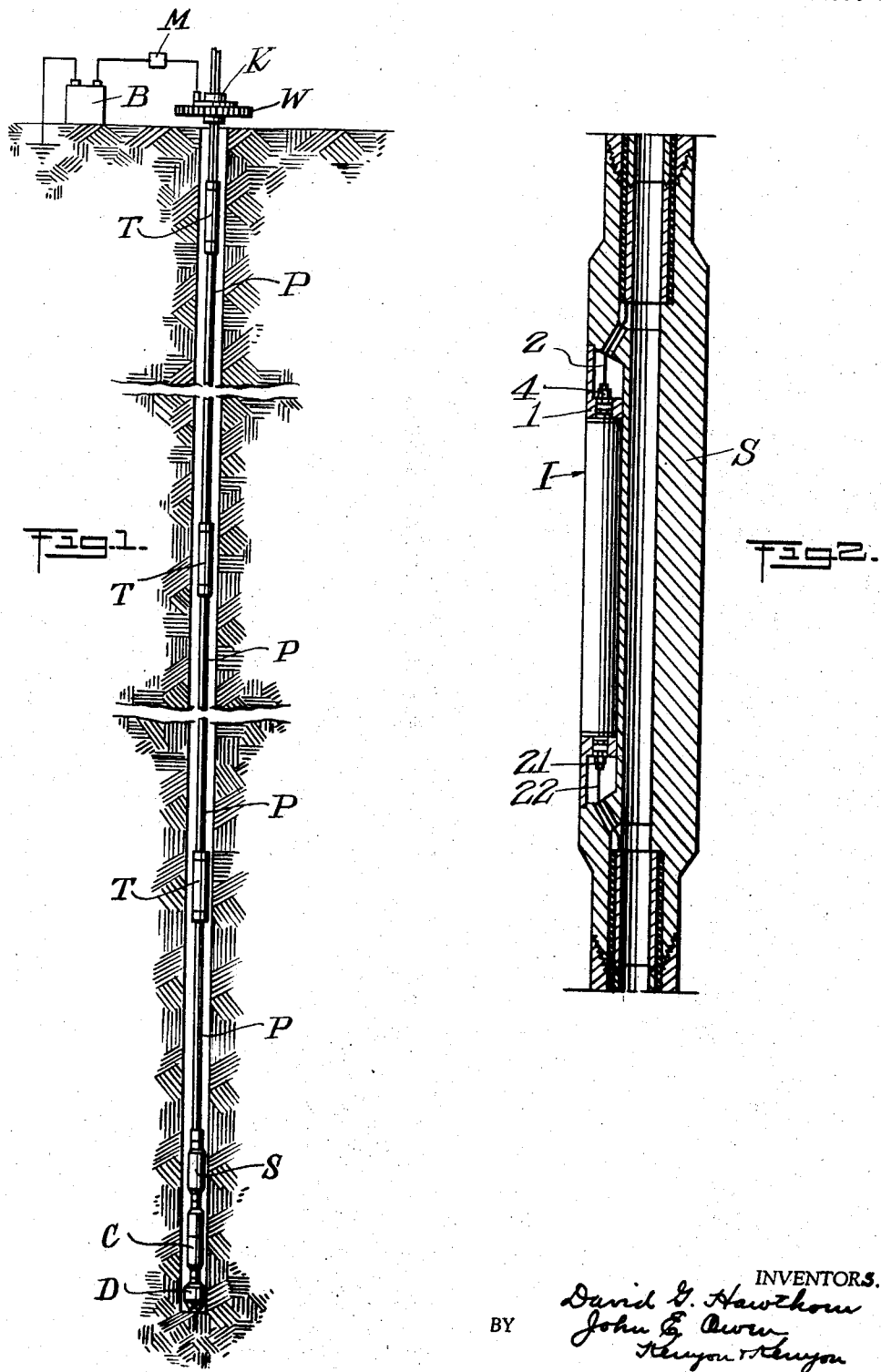

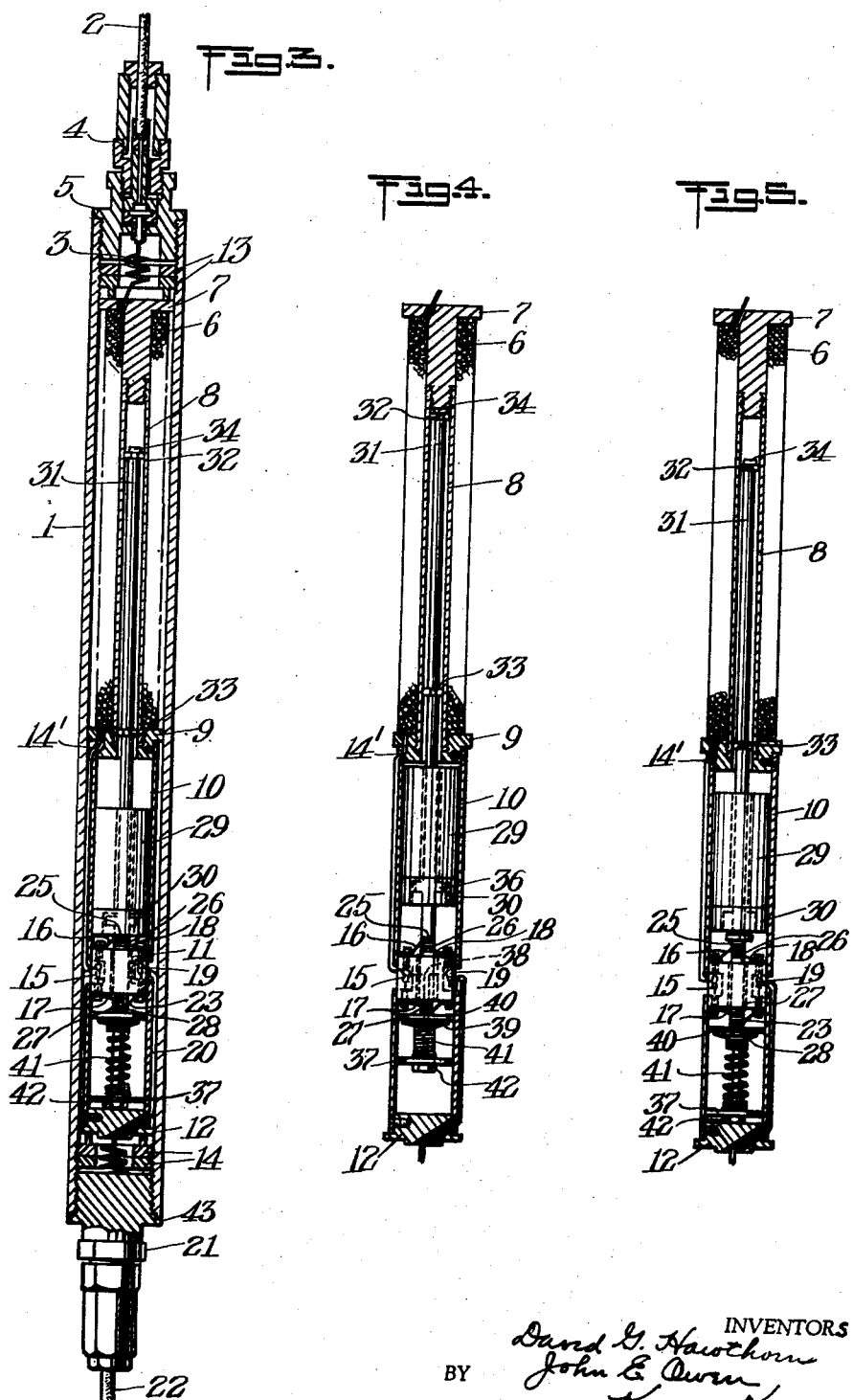

Patented Feb. 13, 1940

2,189,900

UNITED STATES PATENT OFFICE 2,189,900

DRILL STEM CIRCUIT TESTER

David G. Hawthorn and John E. Owen, Tulsa, Okla., assignors to Geophysical Research Corporation, New York, N. Y., a corporation of New Jersey Application June 18, 1938, Serial No. 214,457

20 Claims. (Cl. 175—182)

This invention relates to testing drill stem circuits used in connection with well boring apparatus for sub-surface surveying. Such a drill stem circuit is illustrated in the patent to David G. Hawthorn, 2,096,359 of October 19, 1937.

The proper operation of a drill stem circuit such as disclosed in the said Hawthorn patent is dependent upon having good contact at each of the many joints in the string of pipes and very little leakage of current at each joint. The ohmmeter at the surface indicates the total response of the circuit and for diagnostic purposes, it must be assumed that any change in resistance observed is produced by a change in the resistivity of the material adjacent the bit. If, however, a high resistance contact develops at one or more joints, the resistance of the circuit as measured at the surface will increase and conversely a shunt path produced by leakage at the joints will cause a decrease in the observed circuit resistance. It is therefore important to provide some method of testing the circuit through the drill stem at frequent intervals while the drill stem is in operation to determine whether or not there are any defective joints.

An object of this invention is to provide a drill stem circuit with means by which the circuit may be tested for high resistance joints and leakage without interrupting operation of the bit.

According to one embodiment of this invention, the circuit is provided with a switch which normally connects the drill bit to the ohm meter and battery or other suitable source at the surface and is operable to open the circuit to the bit or short circuit it to the drill stem. In the former circumstance, the ohm meter will read infinity unless there is a leakage somewhere in the system while in the latter circumstance, the ohmmeter will indicate the resistance of the circuit consisting of the conductor down to the switch and the drill pipe back to the surface. Any high resistance contact in the joints will be immediately apparent from the meter reading. Preferably, the switch is electrically operated by current supplied thereto through the circuit to be tested, such current being of greater amperage than the current used for surveying and being applied only temporarily to condition the switch.

Other objects, novel features and advantages of this invention will become apparent from the following specification and accompanying drawings, wherein:

Fig. 1 is a diagrammatic view of a drill stem equipped with a switch embodying the invention.

Fig. 2 is an enlarged section of a special portion of the drill stem, called a "sub," in which the switch is mounted;

Fig. 3 is a section through the switch showing the parts in normal position, and Figs. 4 and 5 are similar views illustrating different positions assumed by the switch during its operation.

In Fig. 1 is shown a drill stem made up of a large number of pipe sections P connected by tool joints T in the usual manner while D is the bit and C is the insulation covered drill collar. A cable consisting of sections carried by the respective pipes P and interconnected at the pipe joints extends through the drill stem. K represents the standard kelly joint provided with the usual driving wheel W on which is provided a suitable electrical contact (not shown) which is connected to the top of the cable and by any suitable collector ring and brush arrangement with one of the terminals of a battery B, the other terminal of which is grounded through the ohmmeter M. The apparatus just described is the subject-matter of Hawthorn Patent No. 2,096,359 and constitutes no part of this invention.

In the drill stem, the cable is provided with an instrument I (Fig. 2) known as a line switch and consisting of a machanism enclosed in a suitable housing 1 which is connected by suitable clamps to a drill stem section S of special construction to receive it. A portion 2 of the cable is connected to a flexible lead 3 arranged in a packing gland 4 screwed into the upper end of the casing 1 with a gasket 5 between a shoulder on the gland and the end of the casing (Fig. 3). The lead 3 is connected to a solenoid winding 6 arranged on a form consisting of an upper pole-piece 7 of magnetic material such as iron, a tube 8 of non-magnetic material, such as brass and a lower pole-piece 9 of magnetic material. An inner housing 10 is suitably fastened to the lower pole-piece 9 and supports in its interior a terminal block 11 of suitable insulating material such, for example, as Bakelite. A cap 12 closes the lower end of the housing 10. Locking rings 13 and 44 engage the upper pole-piece 7 and the cap 12 to hold the switch in proper position in the casing 1. The lower end of the casing 1 is closed by a packing gland 21 between which and the casing is provided a gasket 43.

The lower end of the coil 6 is connected through an insulated lead 14′ to a connecting terminal 15 supported by the block 11 which also supports contact springs 16 and 17 connected to the terminal 15. These contact springs are provided with contacts 25 and 27 made of suitable contact material such, for example, as silver. A contact spring 18 supported by the block 11 is connected to the terminal 19 also supported by the block 11 and an insulating lead 20 extends from the terminal 19 through the packing gland 21 to the conductor 22 which constitutes the portion of the cable leading to the drill bit. A further contact spring 23 is supported by the block 11 and is connected to the housing 10, thereby establishing an electrical path from the spring to the drill pipe. The springs 18 and 23 are provided respectively with contacts 26 and 28.

A weight 29 capped at the bottom with a piece of insulating material 30 is arranged in the housing 10 between the terminal block 11 and the pole-piece 9 and is free to move in the housing. Normally, this weight engages the contact 25 to hold it against the contact 26, thus establishing an electrical circuit from the cable 2 to the cable 22 through the flexible lead 3, coil winding 6, lead 14, terminal 15, contact spring 16, contacts 25 and 26, spring 18, terminal 19 and lead 20.

Within the tube 8 is provided a soft iron armature 31 for the solenoid winding 6. The casing 1 is filled with a viscous fluid such as oil to a point above the lower pole-piece 9 and preferably above the upper end of the coil winding 6. On the armature 31 are provided two centralizing guide members 32 and 33 which, together with the bearing 35 in the terminal block 11 guide the armature. A stop 34 of non-magnetic material prevents the armature from sticking against the upper pole-piece 7, after it has engaged the stem and current is shut off in the coil winding. A lift ring 36 is provided on the armature 31 to the lower end of which is attached a delay disk 37. The lower portion of the armature is of smaller diameter than the upper portion, thus providing a shoulder 38 and on the smaller diameter portion of the armature is provided a contact closing disk 39 on which rests a disk 40 of insulating material, the disks 39 and 40 being freely slidable on the smaller diameter portion of the armature. A spring 41 normally holds the disk 40 in contact with the shoulder 38 and is of sufficient strength to close the contacts 23 and 27 when the armature is lifted. The lower end of the spring 41 bears against disk 37 held on the armature by a nut 42, this nut also serving to limit the downward movement of the armature by contact with the housing cap 12.

When using the drill stem circuit for measuring the earth's resistance for sub-surface surveying, a current of approximately .2 ampere is used, the switch elements being in the position shown in Fig. 3 with the contacts 25 and 26 in engagement. However, when it is desired to test the circuit, the switch is operated by passing a much larger current, for example, a current of two amperes through the circuit, such current being sufficient to energize the solenoid to lift the armature 31. During the first fraction of an inch of upward movement of the armature 31, contacts 27 and 28 are brought into engagement by the disk 40. Upon further movement of the armature, the ring 36 lifts the weight 29 thereby allowing the contact spring 16 to disengage the contacts 25 and 26. The armature then continues to the end of its stroke to take the position shown in Fig. 4. During the operation of the armature, the electrical connection from the lower end of the coil winding 6 is transferred to the inner housing 10 of the line switch (and consequently to the end of the drill pipe) before it is removed from the cable 22 so that the flow of current is continuous with the drill pipe acting as the return conductor.

After the armature reaches the upper limit of its motion as shown in Fig. 4, the current supplied to the circuit is reduced to the current normally used for sub-surface surveying and the reading of the ohmmeter is observed. The reading at this time will be an indication of the series resistance in the cable and will indicate whether or not there is any high resistance joint. The solenoid having been de-energized, the armature 31 and weight 29 begin to fall and the disk 37 slows down the rate of movement of the armature. The contacts 27 and 28 will remain closed for a suitable period during which there is ample time to obtain the resistance reading indicative of the series resistance in the cable.

Further downward movement of the armature brings it into the position shown in Fig. 5, in which it has reached its lower limit, but the weight 29 is still somewhat above its lower limit, the weight having moved downwardly at a lower speed than the armature because of the relation of its diameter to the diameter of the housing 10. The contacts 27 and 28 are now open as the shoulder 38 has forced the contact closing disk 40 away from the contact 28, but the contacts 25 and 26 respectively are still open, since the weight 29 has not yet engaged the contact 25. From the time that the contacts 27 and 28 open as in Fig. 5, to the time that the weight 29 closes the contacts 25 and 26, the lower end of the coil winding 6 is disconnected both from the drill pipe and from the drill bit. During this interval, a reading is made of the ohmmeter to obtain an indication of the insulation resistance. When the weight 29 reaches the lower limit of its motion, the switch is again in the position shown in Fig. 3 and the circuit is again conditioned for sub-surface surveying.

While the invention has been disclosed in connection with a drill stem circuit, it is nevertheless, capable of use in testing the resistance and leakage of any conductor which is lowered into a well. For example, the invention may be used in connection with an insulated conductor carrying an electrode at its lower end by means of which resistivity measurements are made and the data thus obtained used in determining the nature of the strata through which the bore hole passes, the switch being provided for the purpose of testing the resistance and leakage of the conductor. It is furthermore understood that the invention is not limited to the particular embodiment disclosed, and that various structural changes and modifications may be made without in any way departing from the spirit of the invention as defined in the appended claims.

We claim:

1. In combination, a metallic drill stem, a metallic bit insulatingly connected thereto, an insulated electrical conductor extending through said drill stem, and switch means for selectively connecting said conductor to said bit, to said stem, or to an open circuit.

2. In combination, a metallic drill stem, a metallic bit insulatingly connected thereto, an insulated electrical conductor extending through said drill stem, and electrically operated switch means for selectively connecting said conductor to said bit, to said drill stem or to an open circuit.

3. In combination, a metallic drill stem, a metallic bit insulatingly connected thereto, an insulated electrical conductor extending through said drill stem, a source of electrical energy and an electrical measuring instrument connected between one end of said conductor and the earth, and switch means for selectively connecting the other end of said conductor to said bit, to said stem, or to an open circuit.

4. In combination, a metallic drill stem, a metallic bit insulatingly connected thereto, an insulated electrical conductor extending through said drill stem, a source of electrical energy and an electrical measuring instrument connected between one end of said conductor and the earth, and electrically operated switch means for selectively connecting the other end of said conductor to said bit, to said stem, or to an open circuit.

5. In combination, a metallic drill stem, a metallic bit insulatingly connected thereto, an insulated electrical conductor extending through said stem, switch means for connecting said conductor to said bit, to said stem or to an open circuit and electrically responsive means in circuit with said conductor for actuating said switch means.

6. In combination, a metallic drill stem, a metallic bit insulatingly connected thereto, an insulated electrical conductor extending through said stem, switch means for connecting one end of said conductor either to said bit, or to said stem or to an open circuit, electrically responsive means in circuit with said conductor for actuating said switch means, and a source of electrical energy and an electrical measuring instrument connected between the other end of said conductor and the earth.

7. In combination, a multiple section drill stem, a bit insulatingly connected thereto, a multiple section insulated electrical conductor extending through said drill stem, and switch means for selectively connecting said conductor to said bit, to said stem, or to an open circuit.

8. In combination, a multiple section drill stem, a bit insulatingly connected thereto, a multiple section insulated electrical conductor extending through said drill stem, and electrically operated switch means for selectively connecting said conductor to said bit, to said drill stem, or to an open circuit.

9. In combination, a multiple section drill stem, a bit insulatingly connected thereto, a multiple section insulated electrical conductor extending through said drill stem, a source of electrical energy and an electrical measuring instrument connected between one end of said conductor and the earth, and switch means for selectively connecting the other end of said conductor to said bit, to said stem, or to an open circuit.

10. In combination, a multiple section drill stem, a bit insulatingly connected thereto, a multiple section insulated electrical conductor extending through said drill stem, a source of electrical energy and an electrical measuring instrument connected between said conductor and the earth, and electrically operated switch means for selectively connecting said conductor to said bit and stem.

11. In combination, a multiple section drill stem, a bit insulatingly connected thereto, a multiple section insulated electrical conductor extending through said drill stem, switch means for connecting said conductor to either said bit, to said stem, or to an open circuit, and electrically responsive means in circuit with said conductor for selectively actuating said switch means.

12. In combination, a multiple section drill stem, a bit insulatingly connected thereto, a multiple section insulated electrical conductor extending through said drill stem, switch means for connecting one end of said conductor to said bit, said stem or to an open circuit, electrically responsive means in circuit with said conductor for selectively actuating said switch means, and a source of electrical energy and an electrical measuring instrument connected between said conductor and the earth.

13. The method of testing a circuit including an insulated conductor extending through a drill stem and a drill bit insulated from said stem, said method consisting of selectively opening and grounding said circuit adjacent said bit measuring the resistance of the conductor when the circuit is grounded, and measuring the leakage resistance of the conductor, to ground, when the circuit is open.

14. In combination, a metallic drill stem, a metallic bit insulatingly connected thereto, an electrical conductor extending through said drill stem, and switch means for selectively connecting said conductor to said bit, said stem or to an open circuit, said switch means comprising a casing electrically connected to said stem, a solenoid winding having one end connected to said conductor, a first and a second pair of spring-supported contacts with the contacts of said pair tending to move away from each other, connections between the remaining end of said solenoid winding and one contact of each pair, the second contact of the first pair being connected to said bit and the second contact of the second pair being connected to said casing, an armature for said solenoid, a weight having a lost motion connection with said armature and being effective normally to maintain said first pair of contacts in engagement, and a disk slidably mounted on said armature under spring tension in position to close said second pair of contacts upon movement of said armature.

15. In combination, a metallic drill stem, a metallic bit insulatingly connected thereto, an electrical conductor extending through said drill stem, and switch means for selectively connecting said conductor to said bit, said stem or an open circuit, said switch means comprising a casing electrically connected to said stem, a solenoid winding having one end connected to said conductor, a first and a second pair of spring-supported contacts with the contacts of each pair tending to move away from each other, connections between the remaining end of said solenoid winding and one contact of each pair, the second contact of the first pair being connected to said bit and the second contact of the second pair being connected to said casing, an armature for said solenoid, a weight having a lost motion connection with said armature and being effective normally to maintain said first pair of contacts in engagement, a disk slidably mounted on said armature, a spring urging said disk toward said second pair of contacts and a stop holding said disk out of engagement with said second pair when said armature is in position of rest.

16. In a device for use in a bore hole for measuring electrical characteristics of the earth, an insulated first electrical conductor extending into the bore hole, an earth-contacting electrode in said bore hole at the end of said conductor, a second electrical conductor extending into said bore hole, and switch means adjacent said electrode for selectively open-circuiting said first conductor, connecting it to said electrode or connecting it to said second conductor.

17. In a device for use in a bore hole for measuring electrical characteristics of the earth, an insulated first electrical conductor extending into the bore hole, an earth-contacting electrode in said bore hole at the end of said conductor, a second electrical conductor extending into said bore hole, and electrically operated switch means adjacent said electrode for selectively open-circuiting said first conductor, connecting it to said electrode or connecting it to said second conductor.

18. In a device for use in a bore hole for measuring electrical characteristics of the earth, an insulated first electrical conductor extending into the bore hole, an earth-contacting electrode in said bore hole at the end of said conductor, a second electrical conductor extending into said bore hole, switch means adjacent said electrode for selectively open-circuiting said first conductor, connecting it to said electrode or connecting it to said second conductor, and electrically responsive means in circuit with said insulated conductor for actuating said switch means.

19. In a device for use in a bore hole for measuring electrical characteristics of the earth, an insulated first conductor extending into the bore hole, an earth-contacting electrode in the bore hole at the end of said conductor and switch means adjacent said electrode for selectively open-circuiting said conductor or connecting it to said electrode.

20. In combination, a metallic drill stem, a metallic bit insulatingly connected thereto, an insulated electrical conductor extending through said drill stem, and electrically operated switch means for selectively connecting said conductor to said bit or open-circuiting said conductor.

DAVID G. HAWTHORN.
JOHN E. OWEN.

CERTIFICATE OF CORRECTION.

Patent No. 2,189,900.  February 13, 1940.

DAVID G. HAWTHORN, ET AL.

It is hereby certified that error appears in the printed specification of the above numbered patent requiring correction as follows: Page 1, second column, line 31, for "machanism" read mechanism; page 3, second column, line 34, claim 14, for the word "said" read each; and that the said Letters Patent should be read with this correction therein that the same may conform to the record of the case in the Patent Office.

Signed and sealed this 19th day of March, A. D. 1940.

Henry Van Arsdale,
Acting Commissioner of Patents.

(Seal)